United States Patent
Condict et al.

(10) Patent No.: US 10,606,773 B2
(45) Date of Patent: Mar. 31, 2020

(54) SYSTEMS AND METHODS FOR LOW LATENCY ACCESS OF MEMORY BETWEEN COMPUTING DEVICES

(71) Applicant: Lenovo Enterprise Solutions (Singapore) Pte. Ltd., New Tech Park (SG)

(72) Inventors: Michael Neil Condict, Hurdle Mills, NC (US); Jonathan Randall Hinkle, Morrisville, NC (US)

(73) Assignee: Lenovo Enterprise Solutions (Singapore) Pte. Ltd., New Tech Park (SG)

(*) Notice: Subject to any disclaimer, the term of this patent is extended or adjusted under 35 U.S.C. 154(b) by 553 days.

(21) Appl. No.: 15/397,960

(22) Filed: Jan. 4, 2017

(65) Prior Publication Data

US 2018/0189199 A1 Jul. 5, 2018

(51) Int. Cl.
| | |
|---|---|
| *G06F 13/16* | (2006.01) |
| *G06F 3/06* | (2006.01) |
| *G06F 13/42* | (2006.01) |
| *H04L 29/06* | (2006.01) |
| *G06F 21/44* | (2013.01) |

(52) U.S. Cl.
CPC ............ *G06F 13/161* (2013.01); *G06F 3/067* (2013.01); *G06F 3/0611* (2013.01); *G06F 3/0644* (2013.01); *G06F 3/0647* (2013.01); *G06F 3/0659* (2013.01); *G06F 3/0679* (2013.01); *G06F 13/4282* (2013.01); *G06F 21/44* (2013.01); *H04L 63/083* (2013.01); *G06F 2213/0026* (2013.01)

(58) Field of Classification Search
CPC ...... G06F 21/78; G06F 13/161; G06F 3/0601; G06F 13/4282; G06F 21/44; G06F 2212/1052; H04L 63/083
See application file for complete search history.

(56) References Cited

U.S. PATENT DOCUMENTS

| | | | |
|---|---|---|---|
| 8,086,585 B1 * | 12/2011 | Brashers | G06F 16/137 |
| | | | 707/705 |
| 2004/0064590 A1 * | 4/2004 | Starr | H04L 29/06 |
| | | | 709/250 |

(Continued)

OTHER PUBLICATIONS

Nagarakatte et al.: "Watchdog: Hardware for Safe and Secure Manual Memory Management and Full Memory Safety", Proceedings of the 39th International Symposium on Computer Architecture (2012), Jun. 2012, pp. 1-12 (Year: 2012).*

*Primary Examiner* — Paul E Callahan
(74) *Attorney, Agent, or Firm* — Olive Law Group, PLLC

(57) ABSTRACT

Disclosed are methods and systems for low latency modification of memory on a remote computer system. According to one aspect of the present disclosure, a method includes, at a first computing device, receiving from a second computing device, a memory access request including a security key and a unique identifier generated by the first computing device. The method further includes verifying, based on the security key and the unique identifier, that the first computing device is authorized to access a predetermined portion of memory. Also, in response to verifying that the first computing device is authorized to access the predetermined portion of memory, accessing, by the second computing device, the predetermined portion of memory.

18 Claims, 7 Drawing Sheets

(56) References Cited

U.S. PATENT DOCUMENTS

| | | | |
|---|---|---|---|
| 2007/0183198 A1* | 8/2007 | Otsuka | G06F 3/0622 |
| | | | 365/185.04 |
| 2017/0091104 A1* | 3/2017 | Rafacz | G06F 12/0862 |
| 2017/0262387 A1* | 9/2017 | Sell | G06F 9/45558 |
| 2018/0137309 A1* | 5/2018 | Shapira | G06F 21/79 |

* cited by examiner

SYSTEMS AND METHODS FOR LOW LATENCY ACCESS OF MEMORY BETWEEN COMPUTING DEVICES

TECHNICAL FIELD

The present subject matter relates to memory transfer and access between computing devices. More particularly, the presently disclosed subject matter relates to systems and methods for low latency modification of memory between computing devices.

BACKGROUND

Current database storage computing systems achieve zero-loss high availability by replicating state changes from the primary server to its high-availability target server. Generally, a journal or write log is recorded which includes a record of the most recent updates to the database or write commands executed to the storage. In order to have zero-loss of data upon a primary server failure, a procedure known as synchronous replication can be performed.

When performing storage replication, many database systems utilize remote direct memory access (RDMA). RDMA permits low-latency networking between remote computer systems when accessing direct memory from one computer system into another without accessing the operating system of the remote computer system being targeted. RDMA can be used over InfiniBand (TB) or Ethernet.

Although this type of memory access is often used due to its adequacies when recording updates to slower storage systems, e.g. flash memory, it can create a major computing "bottleneck" with respect to the performance of in-memory applications which utilize high-speed non-volatile memory (NVRAM). For instance, one major characteristic of NVRAM is the fact that this type of memory is significantly faster than flash memory when executing both reading and writing commands and requires less computing power.

Another way, as known in the art, for executing high speed replication between remote computer systems is to incorporate non-transparent bridging (NTB) on a peripheral component interconnect express (PCIe) connection between the two computer systems. This type of configuration can allow the primary system to "see" the physical address space of the high-availability partner and use store instructions targeted at the appropriate physical addresses in the partner in order to replicate the NVRAM. However, there are many disadvantages of this type of setup.

First, network security issues arise and the inability to safeguard the provider or target system from virus or other bugs in the application that cause the system to write to inappropriate memory addresses in the partner, causing serious and costly system failures or system corruption with the memory. Furthermore, when there are two applications running on the primary system, which is highly likely, the replication process will not work because the memory would need to be separately replicated to different, non-contiguous areas of physical memory on the partner which poses another costly and impractical attempt to replicate using this configuration.

Second, the performance of the processors can be significantly affected. As will be understood for current processors, when a stored instruction is executed on memory accessed via the PCIe interconnect, the data is broken up into packets that only contain 16 bytes each. This is much smaller than the maximum payload size of up to 4096 bytes even if the widest possible stored instruction is used (which stores 32 bytes). Breaking the data into these packets during transfer unfortunately produces extremely poor use of the PCIe bandwidth and actually increases latency.

In view of the foregoing, there is a need for improved memory replication and memory modification among networked computer systems at low latency.

SUMMARY

Disclosed herein are systems and methods for low latency access of memory among computing systems, including both reading and writing the memory. According to an aspect of the present disclosure, a method includes receiving, from a second computing device, a memory access request including a security key and unique identifier generated by the first computing device. The method also includes verifying, based on the security key and the unique identifier, that the first computing device is authorized to access a predetermined portion of memory. The method further includes accessing, by the second computing device, the predetermined portion of memory in response to verifying that the first computing device is authorized to access the predetermined portion of memory.

According to another aspect of the present disclosure, a computing device is provided. The computing device includes a memory, a processor, and a remote memory controller. The remote memory controller receives, from another computing device, a memory access request including a security key and a unique identifier generated by the other computing device. The remote memory controller can also verify, based on the security key and unique identifier, that the second computing device is authorized to access a predetermined portion of memory. Further, the remote memory controller can access the predetermined portion of memory in response to verifying that the other computing device is authorized to access the predetermined portion of memory.

According to another aspect of the present disclosure, a computing device is provided. The computing device includes a communications device that communicates via a PCIe interconnect. The other computing device includes a predetermined portion of memory, and a memory manager receives, from the other computing device, a security key and unique identifier for accessing a predetermined portion of memory associated with the other computing device. The memory manager can also communicate, to the other computing device, a memory access request including the security key and unique identifier via the PCIe interconnect. Further, the memory manager can access the predetermined portion of memory upon receipt of permission from the other computing device.

BRIEF DESCRIPTION OF THE DRAWINGS

The illustrated embodiments of the disclosed subject matter will be best understood by reference to the drawings, wherein like parts are designated by like numerals throughout. The following description is intended only by way of example, and simply illustrates certain selected embodiments of devices, systems, and processes that are consistent with the disclosed subject matter as claimed herein.

DETAILED DESCRIPTION

Figure 1:
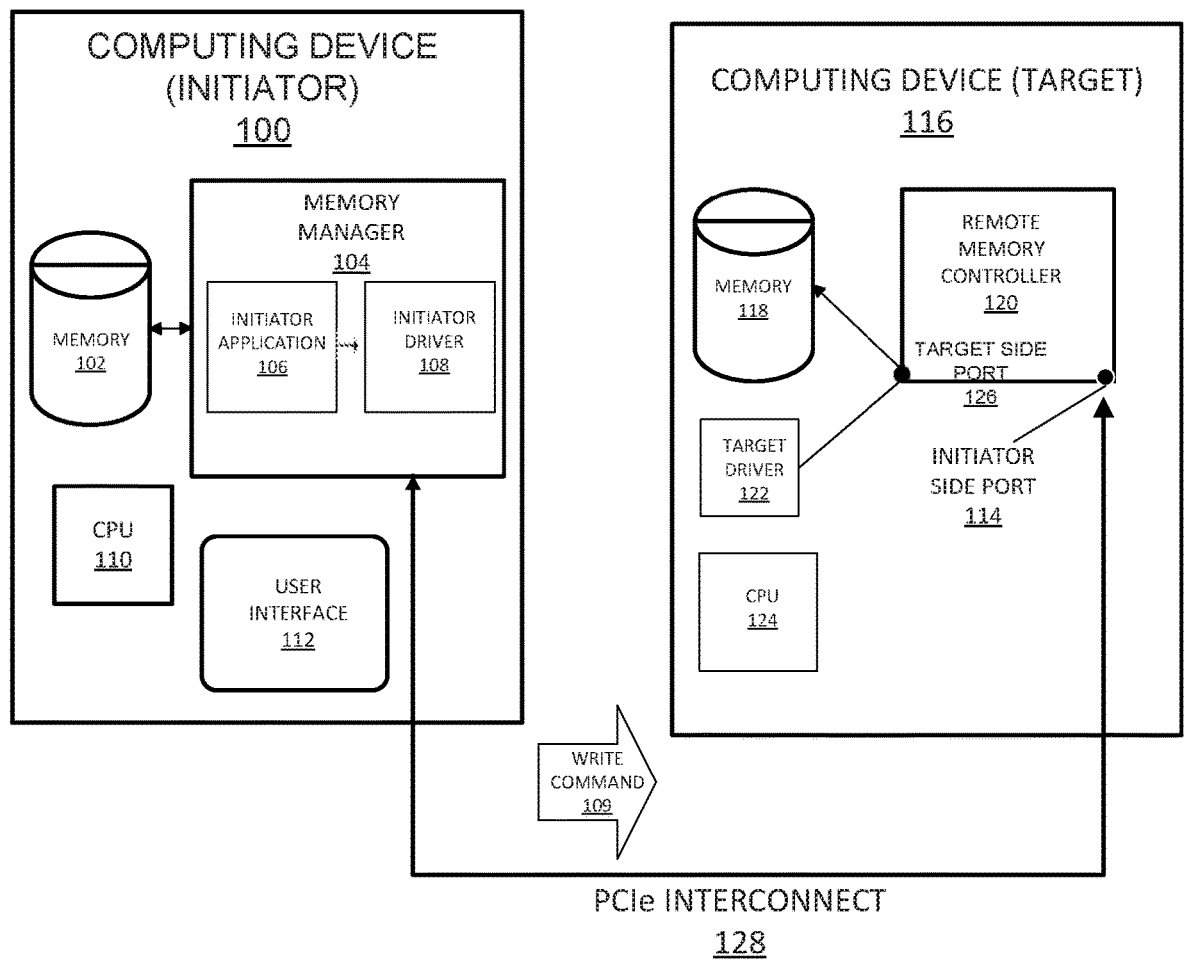
FIG. 1 is a schematic diagram of an example system for low latency access of remote memory in accordance with embodiments of the present disclosure.

The following detailed description is made with reference to the figures. Exemplary embodiments are described to illustrate the disclosure, not to limit its scope, which is defined by the claims. Those of ordinary skill in the art will recognize a number of equivalent variations in the description that follows.

As referred to herein, the term "computing device" should be broadly construed. It can include any type of device including hardware, software, firmware, the like, and combinations thereof. A computing device may include one or more processors and memory or other suitable non-transitory, computer readable storage medium having computer readable program code for implementing methods in accordance with embodiments of the present disclosure. A computing device may be a server or any other type of computing device. For example, a computing device can be any type of conventional computer such as a laptop computer or a tablet computer. The computing device may also be referred to as an "initiator" computing device and/or a "target" computing device. For instance, a computing device described herein as initiating remote memory modification or replication may be referred to as the initiator, or simply, "the initiator." Also, a computing device referred to herein as having its memory modified or replicated may be known as the target computing device, or simply "the target."

As referred to herein, the term "user interface" is generally a system by which users interact with a computing device. A user interface can include an input for allowing users to manipulate a computing device, and can include an output for allowing the computing device to present information and/or data, indicate the effects of the user's manipulation, etc. An example of a user interface on a computing device includes a graphical user interface (GUI) that allows users to interact with programs or applications in more ways than typing. A GUI typically can offer display objects, and visual indicators, as opposed to text-based interfaces, typed command labels or text navigation to represent information and actions available to a user. For example, a user interface can be a display window or display object, which is selectable by a user of a computing device for interaction. In another example, the user can use any other suitable user interface of a computing device, such as a keypad, to select the display icon or display object. For example, the user can use a track ball or arrow keys for moving a cursor to highlight and select the display object.

As used herein, the term "memory" is generally a storage device of a computing device. Examples include, but are not limited to, Read Only Memory (ROM), Random Access Memory (RAM), or Non-Volatile Random Access Memory (NVRAM).

As used herein, the term "display" is generally a display device used for presenting information in visual or tactile form. For example, a display may be a flexible display. Examples include, but are not limited to, an electronic paper based display, and a flexible organic light emitting diode (OLED) display.

As used herein, the term "driver" may be a type of computer program that includes instructions for controlling a particular type of device attached to a computer. It may also include a software interface to enable various operating systems to computer with other computer programs in order to access certain hardware functions. The driver may invoke routines or other commands through the use of a bus or some other type of hardware interconnect. The driver may also be referred to as an "initiator driver." In an example, the initiator driver can be a simple device driver loaded into the kernel of the initiator computing device's operating system. It accepts various commands, such as a WRITE command with similar parameters. The initiator driver translates virtual memory addresses specified by an application installed in the initiator computer device into a physical address and then passes the specified WRITE command onto an hardware interconnect, e.g. PCIe interconnect, that is attached to the computing device. It also returns any success or failure status as the return code of the system call used to supply the WRITE command. The driver may also be referred to as a "target driver." The target driver is a device driver loaded into the kernel of the operating system on target computing device, or some other user-mode software running in the application of the computing device. It may accept various commands such as a DEFINE_RANGE command or REMOVE_RANGE command.

As used herein, the term "command" may be any type of replication or database command, including but not limited to a READ command, WRITE Command, UPDATE command, DEFINE_RANGE Command, REMOVE_RANGE Command, DELETE command, MAX_TRANSFER command, and so forth.

The device or system for performing one or more operations on a memory of a computing device may be a software, hardware, firmware, or combination of these. The device or the system is further intended to include or otherwise cover all software or computer programs capable of performing the various heretofore-disclosed determinations, calculations, or the like for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as MySQL, BASIC, COBOL, C, C++, Java, Pascal, or scripting languages such as JavaScript, Python, Ruby, PHP, Perl, or other suitable programming languages.

The present disclosure is now described in more detail. For example, FIG. 1 is a schematic diagram of an example system for low latency modification of memory in accordance with embodiments of the present disclosure. Referring to FIG. 1, the system 1000 includes a computing device 100, also referred to as the initiator computing device 100. The computing device 100 may include one or more processors and memory or other suitable non-transitory, computer readable storage medium having computer readable program code for implementing methods in accordance with embodiments of the present disclosure. The computing device 100 is a server, but may alternatively be any other suitable computing device. The computing device 100 includes a memory 102, memory manager 104, initiator application 106, initiator driver 108, CPU 110, and user interface 112. The computing device 100 can receive from and transmit signals to a computing device 116 via a peripheral components interconnect express (PCIe) 128.

The memory manager 104 is configured to communicate with the computing device 116 via PCIe interconnect 128, which will be explained in more detail below. The signals may include, but are not limited to, various types of data, memory addresses, protocols, commands, system calls, or the like. The memory 102 may include a random access memory (RAM), a non-volatile random access memory (NVRAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. The memory 102 may include software instructions implemented by the CPU 110 for carrying out functions disclosed herein.

The CPU 110 may include one or more processors. In an example, the CPU 110 may be a microcontroller that contains a processor core, and programmable input/output peripherals. In embodiments, the CPU 110 may be operatively coupled to a user interface for enabling a user or operator to operate and control the computing device 100. The user interface 112 may include a display (e.g., touchscreen display, LCD flat screen, CRT, or the like) for interfacing with the user for conducting, entering, or viewing commands, outputs, or any other type of data analysis.

Further referring to FIG. 1, the memory manager 104 includes both hardware and software components that include the initiator application 106 and an initiator driver 108. The initiator application 106 may be implemented by any suitable type of data replication or modification management software that is configured to interface with the user. The initiator application 106 may send and receive requests, commands, memory transfer commands, or the like. The initiator application 106 may also reside in memory 102 of the computing device 100 or as a hosted application that is being executed on a server and communicating with the initiator application 106 or browser via a number of standard protocols, such as TCP/IP, HTTP, XML, SOAP, REST, JSON and other suitable protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl, or other suitable programming languages. As stated previously, the initiator driver 108 can be a device driver loaded into the kernel of the imitator computing device's CPU 110. It transmits various commands, such as a WRITE command 109 or any other type of replication or modification command. The initiator driver 108 translates virtual memory addresses specified by an application installed in the initiator computer device into a physical address and then passes READ and WRITE commands onto the PCIe interconnect 128 that is attached to the computing device 100 and 116. It can also return any success or failure status as the return code of the system call used to supply the WRITE command 109. As further noted, although throughout the present disclosure a write command is described, it should be appreciated that any suitable command may be received, transferred, or executed by the presently disclosed system and method. For instance, a read command may also be received, transferred, or executed.

With continued reference to FIG. 1, a computing device 116, also referred to as the target computing device, can include a memory 118, a remote memory controller 120, a target driver 122, a CPU 124, a target side port 126, and initiator side port 114. The target computing device 116 may include one or more processors and memory or other suitable non-transitory, computer readable storage medium having computer readable program code for implementing methods in accordance with embodiments of the present disclosure. Memory 118 may include software instructions implemented by the CPU 124 for carrying out functions disclosed herein. The CPU 124 may include one or more processors for executing instructions for carrying out the processes disclosed in the present disclosure. In an example, the CPU 124 may be a microcontroller that contains a processor core, and programmable input/output peripherals.

The remote memory controller 120 may be a PCIe adaptor card which can include an initiator side port 114 and a target side port 126. The PCIe interconnect 128 may be a cable which is inserted in the initiator side port 114 and extends into the initiator computing device 100. The physical configuration by which the connection between the initiator computing device 100 and the target computing device 116 may be implemented by any means known to one of ordinary skill in the art, so long as the signals which are transmitted via the PCIe interconnect are reliably transmitted in both directions between the initiator computing device 100 and target computing device 116. For example, the connection can be implemented by connecting an OCuLink external PCIe connector and an OCuLink cable inserted into each computing device. The OcuLink cable and connector may be standard PCIe connectors, as well as, cables. A slimline SAS connector and cable may also be used. As an alternate embodiment, if the PCIe interconnect exceeds a maximum distance supported by the PCIe standard, then a signal re-driver could be plugged into the initiator computing device 100 by any compatible cable. As further stated, the initiator side port 114 receives and signals, command, and other types of data being transmitted from the initiator computing device 100 via the PCIe interconnect 114 and processes the signals within the remote memory controller 120.

In at least one embodiment of the present disclosure, the remote memory controller 120 implements at least two commands on the target side port 126. The target side portion 126 is connected to the target driver 122. In yet another embodiment, the remote memory controller 120 may include multiple ports (not shown) in order to receive multiple connections from multiple initiating computing devices with a cluster or network of computing devices. The first command is a RANGE_DEFINE command which defines a range of physical memory addresses of memory 118 of the target computing device 116. The instructions and associated parameters of the RANGE_DEFINE command specify the starting physical memory addresses of memory 118 and the number in any given range specified by the system or the user of the initiator computing device 100. The remote memory controller 120 executes the RANGE_DEFINE command and assigns a unique identifier, via the target driver 122, associated with the defined memory range. The unique identifier may include an integer or some other type of numeric value. The remote memory controller 120, via the target driver 122 further generates a security key associated with the unique identifier and newly define physical memory address range of memory 118. The unique identifier, security key, and defined range may be stored in memory 118. The memory 118 may be volatile memory or non-volatile memory. If the memory 118 is non-volatile, the defined range of physical memory addresses will persist across a power-down or restart operation of each computing device 100 and 116. As such, the RANGE_DEFINE command will not need to be re-executed after such an operation. The security key may be any type of pseudorandom number or integer of at least 64 bits. The security key may be used in order to authorize modification, replication, or otherwise generally access to a predetermined portion of the physical memory range of memory 118.

The other command executed at the target side portion 126 of the remote memory controller 120 is a RANGE_REMOVE command received from the target computing device 100 which removes the unique identifier, security key, and defined memory range from memory 118. In another embodiment of the present disclosure, the remote memory controller 120 executes one WRITE command at the initiator side port 114. The WRITE command is a remote memory-write operation which allows the initiator computing device to modify some or all of the defined physical memory address range to be executed on the target computing device 116. The parameters contained in the WRITE command may include the unique identifier that identifies a previously defined range of physical memory address on the target, a security key proving the right to access that range, the starting offset within that range of the bytes that are to be modified, and the number of bytes of data that are to be copied from the initiator 100 to the specified offset in the target memory range. The initiator computing device 100 can transmit the unique identifier along with the security key with each command. The command may be a WRITE command, a READ command, or the like.

In another embodiment of the present disclosure, the WRITE command may be implemented by the remote memory controller 120 by verifying that the unique identifier is a valid identifier of a permitted range of physical memory addresses designated on the target computing device 116. If the unique identifier is invalid, the target driver 122 will transmit an error or failure indication to the initiator computing device 100 which can be in turn displayed via the user interface 112. Next, the remote memory controller 120 may implement a direct memory access (DMA) operation to transfer the number of bytes of data that are to be copied from the initiator computing device 100 to the target computing device 116 from the physical memory address of memory 102 where the data is to be copied from, e.g. buffer, on the initiator computing device 110 into memory 102 or an internal RAM buffer when the number of bytes of data that are to be copied from the initiator computing device 110 to the target computing device 116 is greater than a certain threshold size configured into memory 118. This configuration parameter may be referred to as the MAX_TRANSFER parameter. The copying is implemented as separate data "chunk" transfers of MAX_TRANSFER size, until the last data chunk is processed, which may be smaller than the MAX_TRANSFER size.

The DMA transfer can be executed continuously in the order the data was stored from the memory 118 into memory 102 as specified by the unique identifier and starting offset. Each transfer may be synchronized by the CPU 124 and other internal registers as known in the art, so that no attempt is made to transfer a data chunk to the target computing device 116 until the data chunk has been fully transferred into the memory 118 or other internal memory of the remote memory controller 120. If any transfer fails, an error is returned to the initiator computing device 100 and all transfer activity is stopped and the memory 118 (or internal RAM buffer) is cleared. When transfers are successfully completed, a successful status is returned to the initiator computing device 100, which in turn can be displayed via the user interface 112. In an alternative embodiment, high speed NVRAM may be used as the internal RAM buffer or memory 118 of the remote memory controller 120. The WRITE command may be acknowledged as soon as all the data is copied into the internal NVRAM buffer memory of the remote memory controller 120 before it is replicated out to the target computing device 116. As such, this type of initial acknowledgement allows the WRITE command to have lower latency from the point of view of the initiator computing device 100.

In yet an alternative embodiment according to the present disclosure, a server-based lifecycle of memory replication is described (not shown in the Figures). For instance, an application on the initiator computing device 106 may determine that it needs a range of memory addresses on the target, for replication or any other kind of access. It will send a network request, via any network interface (not shown), to a server running on the target computing device that is programmed to expect such requests. The request can specify a memory range of a size specified by the application. The server can allocate a range of physical memory on the target for that purpose, and then send a RANGE_DEFINE command to the target driver 122 specifying that range of physical addresses. The target driver may pass the RANGE_DEFINE command to the remote memory controller 120, which will record the new range in its memory and then reply with a unique identifier and a security key for that particular memory range. The server then transmits the identifier and security key over the network to the initiator application 106 as a successful reply to the request. Each time the initiator application 106 desires to modify or replicate the memory range, it uses a WRITE command with the appropriate parameters to cause the modified or replicated portion to be copied to the same offset of the designated memory range on the target computing device 116, in turn keeping both memory ranges in sync. If either computing device 100 or 116 is shut down or decommissioned during operation, a network message is sent to the server software on the target computing device 116, via the initiator computing device 100, indicating that it no longer needs the target memory range. The server will then execute a REMOVE_RANGE command for that given memory range.

Figure 2:
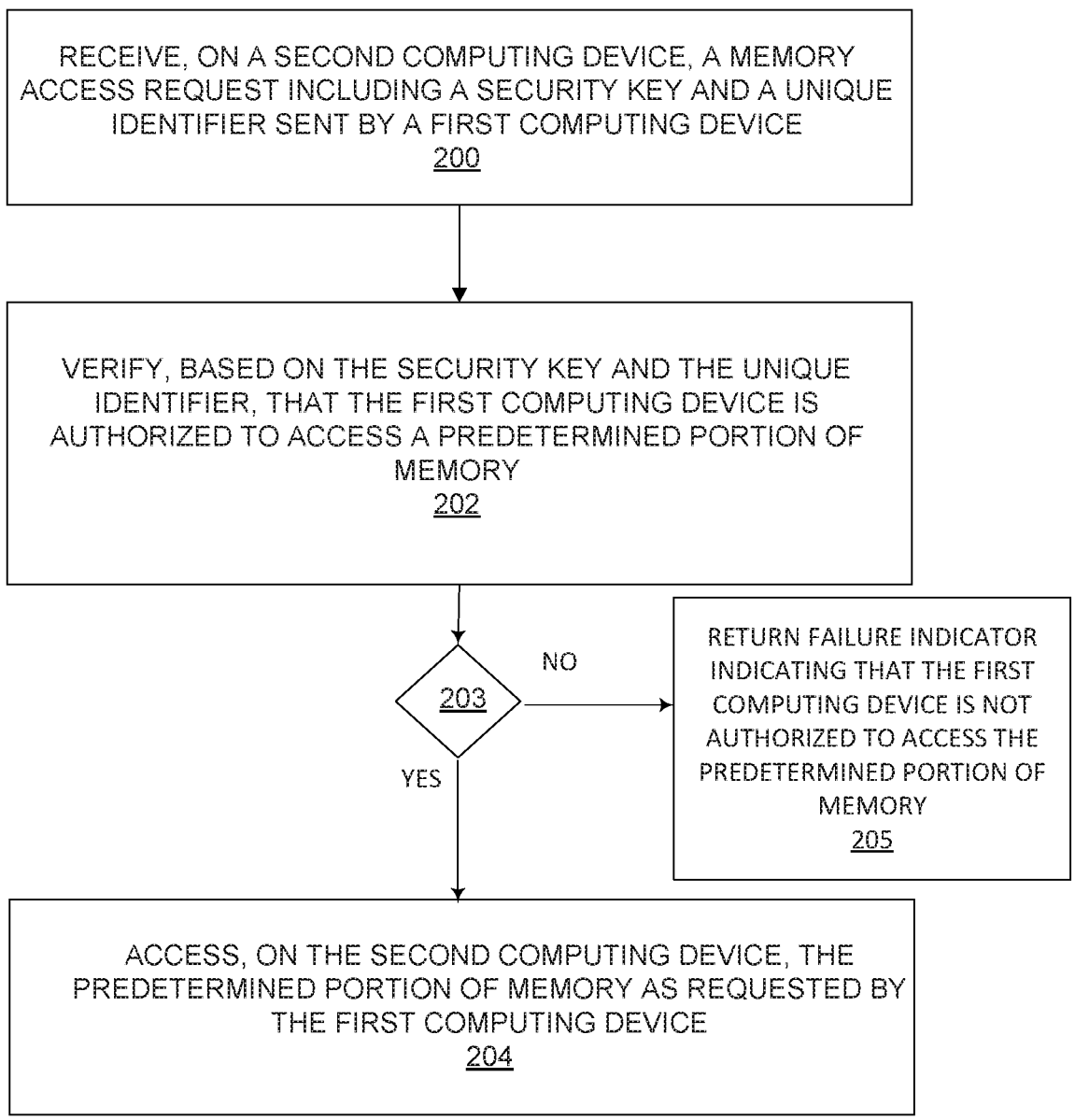
FIG. 2 illustrates a flowchart of an example method for low latency access of remote memory in accordance with embodiments of the present disclosure.

FIG. 2 illustrates a flowchart of an example method for low latency modification of memory in accordance with embodiments of the present disclosure. In this example, the method is described as being implemented by the computing device 116 shown in FIG. 1, although it should be understood that the method may be implemented by any suitable computing device.

Now referring to FIG. 2, the method includes receiving 200 a memory access request including a security key and a unique identifier sent by a first computing device. For example, the computing device 116 shown in FIG. 1 may be configured to receive a memory access request including a security key generated by the other computing device. The memory access request may be any type of request initiated from a computing device, such as computing device 116, which sends a signal requesting access to the physical memory addresses of memory 118 or any other type of memory. As discussed, the security key may be any type of pseudorandom number or integer. The security key is associated with a predetermined portion or range of memory which can only be accessed when the provided security key is verified. The unique identifier can be, for example, a unique integer for each memory area is being targeted, starting at 1 for the first allocated area, 2 for the second allocated area and so forth. The other computing device corresponds to the initiating computing device 100.

The method of FIG. 2 also includes verifying 202, based on the security key and the unique identifier, that the first computing device is authorized to access a predetermined portion of memory. Continuing with the aforementioned example, the computing device 166 may be configured to verify, based on the security key and the unique identifier, that the other computing device 116 is authorized to access a predetermined portion of memory.

At decision block 203, if the computing device is authorized to access the predetermined portion of memory, the method proceeds to block 204 where the method of FIG. 2 includes accessing 204, on the second computing device, the predetermined portion of memory as requested by the first computing device. If the computing device is not authorized to access a predetermined portion of memory, the method continues to block 205 where an error or failure indicator may be transferred or returned indicating that the first computing device is not authorized to access the predetermined portion of memory. The failure indicator or error may be sent to the initiator computing device 100 which may also be displayed on the user interface 112 indicating that the first computing device 100 is not authorized to access the predetermined portion of memory.

Figure 3:
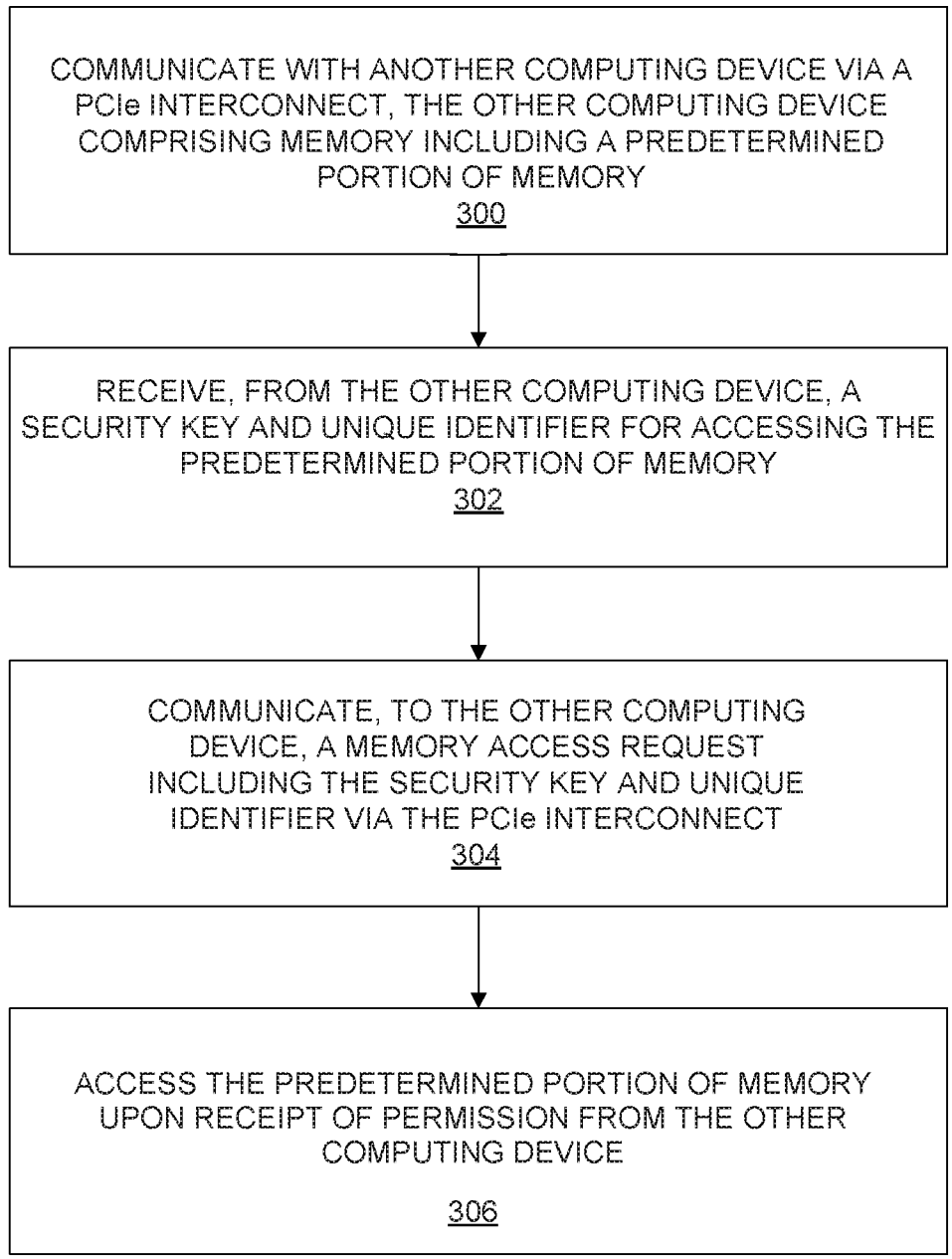
FIG. 3 illustrates a flowchart of another example method for low latency access of remote memory in accordance with embodiments of the present disclosure.

FIG. 3 illustrates a flowchart of an example method for low latency modification of memory in accordance with embodiments of the present disclosure. In this example, the method is described as being implemented by computing device 100 shown in FIG. 1, although it should be understood that the method may be implemented by any suitable computing device.

Referring to FIG. 3, the method includes communicating 300 with another computing device via a PCIe interconnect. For example, the initiator computing device 100 may communicate with another computing device via a PCIe interconnect. The other computing device includes memory having a predetermined portion. In this example, the "other" computing device corresponds to the target computing device 116.

The method of FIG. 3 also includes receiving 302, from the other computing device, a security key and a unique identifier for accessing the predetermined portion of memory; for communicating to the other computing device a memory access request including the security key and the unique identifier, via the PCIe interconnect. At block 302, the initiator computing device 100 is further configured to receive, from the other computing device 116, a security key and the unique identifier for accessing the predetermined portion of memory, communicate, to the other computing device, a memory access request including the security key and the unique identifier, via the PCIe interconnect 128, at block 304, and access the predetermined portion of memory upon receipt of permission from the other computing device 116, at block 306. Still referring to FIG. 3, the memory access request mentioned above in block 304, may be any type of request initiated from a computing device connected to the overall system via the PCIe interconnect such as the computing device 116, or through a computing network, which sends a signal requesting access to the physical memory addresses of memory 118 or any other type of memory. Further, the predetermined portion of memory disclosed at block 306 may be any suitable range of physical memory addresses designated by the user or computing system via system calls or commands. The predetermined portion of memory may be defined by a starting physical memory addresses range, designated physical memory addresses permitted to be the target of a remote memory WRITE command from the initiating computing device 100, or the starting physical memory address and size of the range in bytes in order to allow deletion of the range or predetermined portion of memory when the unique identifier has been lost on the target computing device 116.

Figure 4:
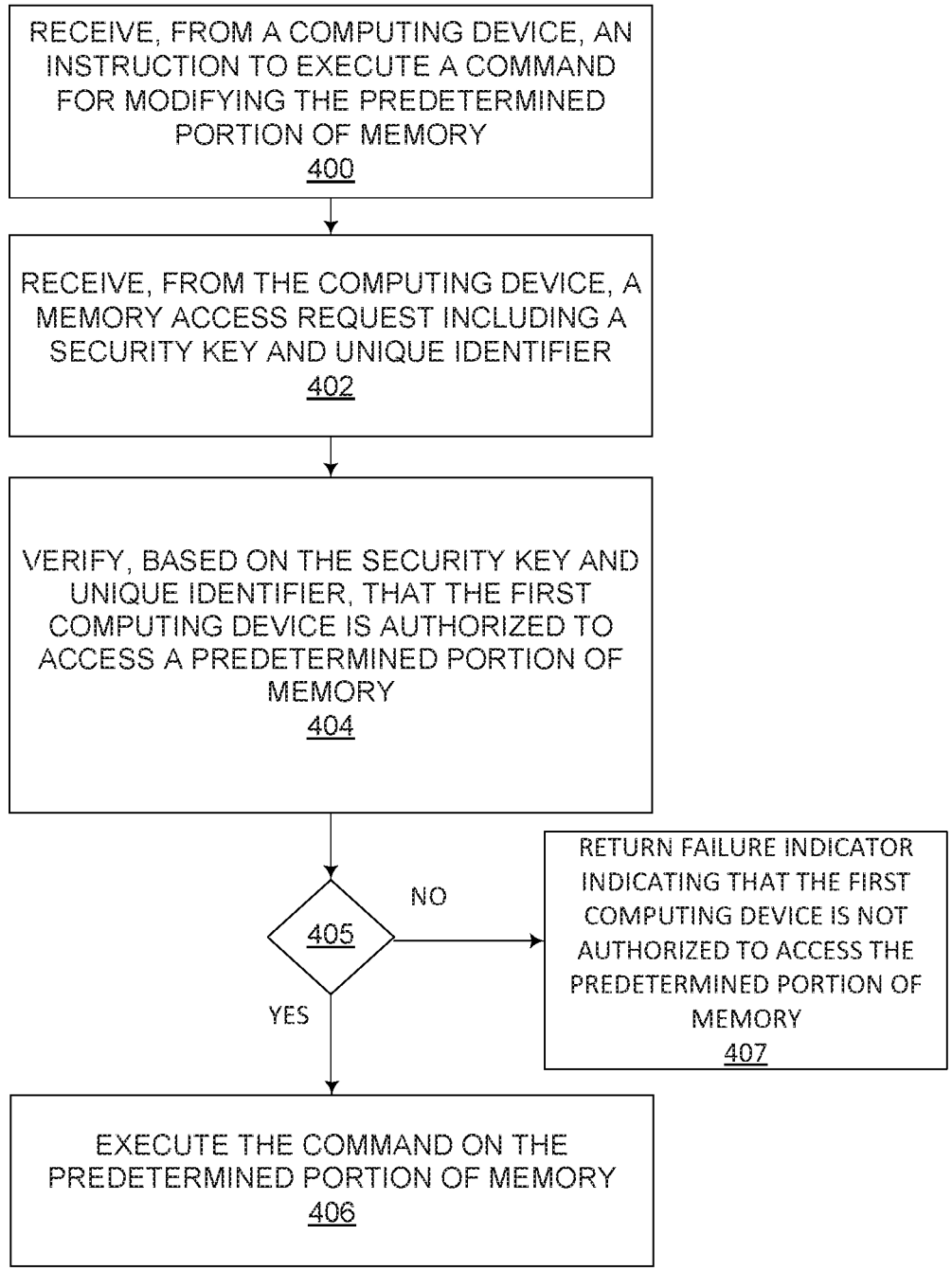
FIG. 4 illustrates a flowchart of an example method for executing a command on a predetermined portion of memory in accordance with embodiments of the present disclosure.

FIG. 4 illustrates a flowchart of an example method for executing a command on a predetermined portion of memory in accordance with embodiments of the present disclosure. In this example, the method is described as being implemented by computing device 116 shown in FIG. 1, although it should be understood that the method may be implemented by any suitable computing device.

Referring to FIG. 4, the method includes receiving 400, from a computing device, an instruction to execute a command for modifying a predetermined portion of memory. For example, the target computing device 116 can receive, from initiating computing device 100, an instruction to execute a command for modifying the predetermined portion of memory. As previously stated, the command may be any type of modification command such as commands for writing data, saving data, transferring data, copying data, or the like. The method also includes receiving 402, from the computing device, a memory access request including a security key and a unique identifier. Continuing the aforementioned example, computing device 116 can receive, from the computing device 100, a memory access request including a security key and unique identifier generated by target computing device 116.

The method of FIG. 4 includes verifying 404, based on the security key and the unique identifier, that the computing device is authorized to access a predetermined portion of memory. Continuing the aforementioned example, computing device 116 can verify, based on the security key and the unique identifier, that the target computing device 116 is authorized to access a predetermined portion of memory. At block 405, if the computing device is authorized to access the predetermined portion of memory, the method proceeds to block 406 where the command is executed on the predetermined portion of memory. Continuing the example, if the computing device 100 is authorized to access a predetermined portion of memory, the computing device 116 can execute the command on the predetermined portion of memory. If the computing device is not authorized to access a predetermined portion of memory, the method continues to block 407 where the command is not executed and the process is ended. As shown in FIG. 4 at block 407, an error or failure indicator may be transferred or returned indicating that the first computing device is not authorized to access the predetermined portion of memory. The failure indicator or error may be sent to the initiator computing device 100 which may also be displayed on the user interface 112 indicating that the first computing device 100 is not authorized to access the predetermined portion of memory.

Figure 5:
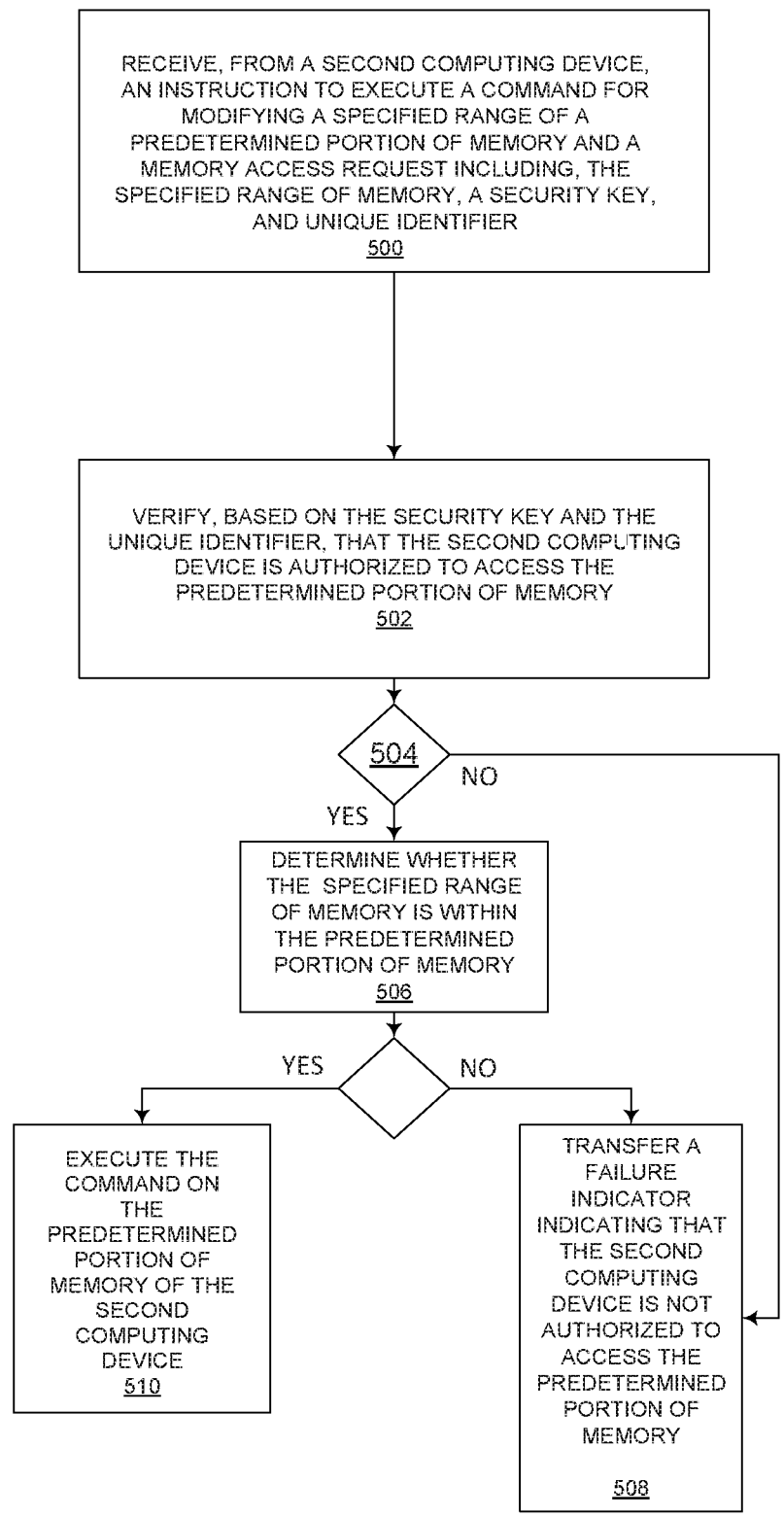
FIG. 5 illustrates a flowchart of an example method for low latency access of memory in a remote computer system in accordance with embodiments of the present disclosure.

FIG. 5 illustrates a flowchart of an example method for executing a command on a predetermined portion of memory and preventing access to the predetermined portion of memory in accordance with embodiments of the present disclosure. In this example, the method is described as being implemented by computing device 116 shown in FIG. 1, although it should be understood that the method may be implemented by any suitable computing device.

Referring to FIG. 5, the method includes receiving 500, from a computing device; an instruction to execute a command for modifying the predetermined portion of memory, receiving and a memory access request including the specified range of memory, security key and a unique identifier; and verifying 502, based on the security key and the unique identifier, that the computing device is authorized to access the predetermined portion of memory. In an example, these steps can be implemented at computing device 116 shown in FIG. 1, and the messages may be received from computing device 100.

As further shown at decision block 504, if the first computing device 116 is authorized to access a predetermined portion of memory, based on the security key and the unique identifier, the method proceeds to block 506, which includes a step for determining whether the specified range of memory is within the predetermined portion of memory. If the computing device is not authorized to access a predetermined portion of memory, the method proceeds to block 508 in which the method displays a failure indicator indicating that the second computing device is not authorized to access the predetermined portion of memory. In another embodiment, the offset and size (in bytes) transferred from the initiator computing device 100 may be used to determine whether the specified range of memory is within the predetermined portion of memory. For example, if the predetermined portion of memory represents a size of 1000 bytes and the offset is 900 bytes and size is 200 bytes, it is inferred that the specified range of memory extends from 900 bytes from the beginning of the predetermined portion of memory up to 1100 bytes, resulting in 100 bytes beyond the end of the predetermined portion of memory. As such, the command may not be executed and a failure indicator can be displayed at block 508. Referring to block 506, the specified range of memory may be, for example, a designated range of physical memory addresses within the memory 118 of the target computing device 116. If the specified range of memory is within the predetermined portion of memory, the method proceeds to block 510. At block 510, the command is executed on the predetermined portion of memory. For further reference, the specified range of memory and the predetermined portion of memory may be different. The specified range of memory may include a permitted memory range from multiple, permitted memory addresses. The specified range of memory may define starting and/or ending physical memory addresses and the number of bytes within the range of physical memory addresses within the memory. If the determination as to whether the specified range of memory at block 506 is not within the predetermined portion of memory, the method proceeds to block 508 in which a failure indicator is transferred indicating that the device is not authorized to access the predetermine portion of memory. In an alternate embodiment, the failure indicator may be displayed by the computing device 100 via the user interface 112.

Figure 6:
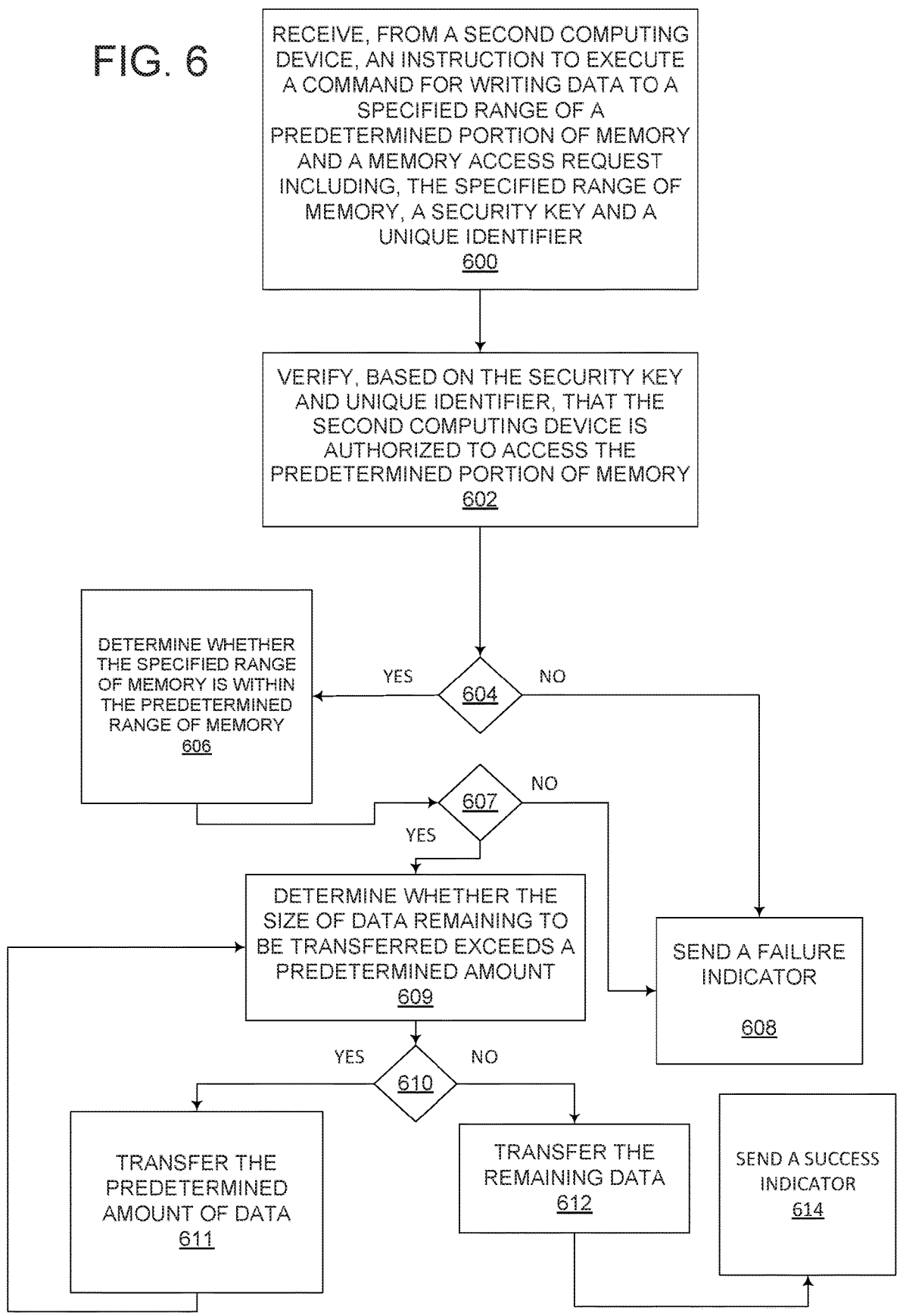
FIG. 6 illustrates a flowchart of an example method for executing a command on a predetermined portion of memory, for preventing access to the predetermined portion of memory, and for buffering data in separate portions of the predetermined portion of memory in accordance with embodiments of the present disclosure.

FIG. 6 illustrates a flowchart of an example method for executing a command on the predetermined portion of memory, for preventing access to the predetermined portion of memory, and for buffering data in separate portions of the predetermined portion of memory in accordance with embodiments of the present disclosure. In this example, the method is described as being implemented by computing device 116 shown in FIG. 1, although it should be understood that the method may be implemented by any suitable computing device Referring to FIG. 6, at block 600, the method may begin with the steps of receiving from second computing device, an instruction to execute a command for writing data to a specified range of a predetermined portion of memory and a memory access request including the specified range of memory, a security key and a unique identifier and verifying, based on the security key and unique identifier, that the second computing device is authorized to access the predetermined portion of memory 602. As shown at decision block 604, if the second computing device is authorized to access the predetermined portion of memory as shown in block 602, then the method proceeds to block 606 where it is determined whether the specified range of memory is within the predetermined portion of memory. If the first computing device is not authorized to access a predetermined portion of memory as shown in block 602, then the step proceeds to block 608 where the command is not executed and a failure indicator is sent to the target computing device. In an alternate embodiment, an error may be sent may also be displayed on the user interface 112. Referring back to block 606, if the specified range of memory is within the predetermined portion of memory, the method proceeds to block 609 as shown at decision block 607. If the security key does not correspond to the specified range of memory, the method proceeds to block 608 which sends a failure indicator. However, referring back to block 609, the method determines whether the size of data remaining to be transferred exceeds a predetermined amount, and if so, the method proceeds to block 611 where the predetermined amount of data is transferred. This step of the process loops back to block 609 until the size of the data remaining to be transferred does not exceed a predetermined amount, as shown at decision block 609. When the size of the data that is remains to be transferred does not exceed a predetermined amount, the remaining data is transferred and a success indicator is sent to the computing device.

In yet an alternate embodiment, the method may further include transferring the predetermined amount of data from the first computing device to the second computing device by buffering the data in separate portions. As discussed previously, transmitting in separate portions may include separate data chunk transfers. In an alternative embodiment, the separate data chunk transfers may be further executed utilizing DMA transfers. For instance, the data may be transmitted one data chunk per iteration and loop back to transfer another data chunk each executed iteration until all data has been successfully transferred. In an alternate embodiment, data may be transferred between the memory 102 and memory 118 by the remote memory controller 120 use of DMA to first copy the data from one computer into a buffer inside the remote memory controller and then copy the data from the buffer to the memory of the other computing device.

Figure 7:
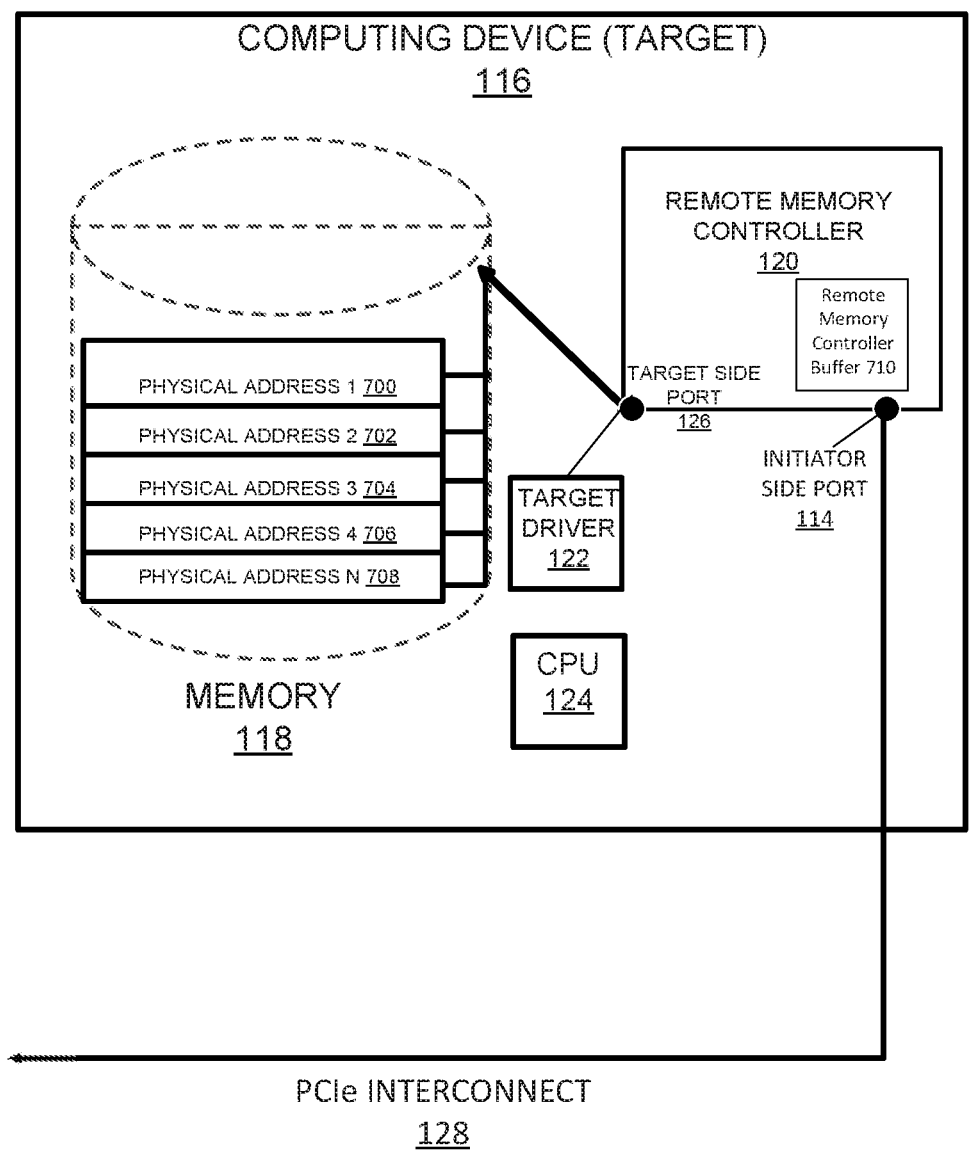
FIG. 7 is a schematic diagram showing example, specific system components of a remote memory controller communicating with a memory of a computing device in accordance with embodiments of the present disclosure.

FIG. 7 illustrates a schematic diagram of the computing device 116 (e.g. target computing device), remote memory controller 120, memory 118, target driver 122, and CPU 124, the target side port 126 communicating with the memory 118, an initiator side port 114 and a remote memory controller memory buffer 710. For instance, the figure illustrates how the remote memory controller implements the aforementioned READ or WRITE commands, by transferring data to or from the memory 118 using the target-side port 126, and transferring data to or from the other computing device using the initiator-side port 114, after verifying from the security key that the computing device connected to the initiator-side port 114 is authorized to access the specified portion of memory 118. According to elements 700, 702, 704, 706, and 708, each element discloses physical memory addresses which may correspond to a permitted range designated at physical memory addresses 1 . . . N, where N is a predetermined maximum value of physical memory addresses. Further, the physical memory addresses at elements 700, 702, 704, 706, and 708 may also correspond to a predetermined portion of memory and/or a plurality of different defined portions of the memory. As described herein, data stored in the predetermined portion of memory 118 may be transferred between the memory 102 and memory 118 by the remote memory controller 120 use of DMA to first copy the data into the remote memory controller buffer 710 within the remote memory controller and then copy the data from the remote memory controller buffer 710 to the memory of the other computing device.

The present disclosure describes various improvements for low latency modification of memory on a remote computer system. The configuration of the remote memory controller 120, including the use (generation and transmittal) of the unique identifier and security key to identify memory ranges and provide additional hardware protection against unauthorized access are important improvements. Furthermore, the present disclosure transfers data from the initiator computing device and the target computing device in parallel via the PCIe interconnect effectively reduces latency which in turn provides a robust transferability and execution of user inputs within a networked or stand-alone computing system. Furthermore, with the emergence of new applications which require low latency, such as, algorithmic trading, cloud computing, real-time gaming, and streaming video the need for low latency modification of memory on remote computer systems has never been as valuable and novel as it is currently.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   at a first computing device:
   receiving, from a second computing device, a memory access request including a starting offset within a specified range of memory, a predetermined size of data, a predetermined portion of memory, security key, and unique identifier generated by the first computing device;
   determining a difference between the offset and the predetermined size of data;
   determining that the specified range of memory is within a predetermined portion of memory based on whether the difference exceeds the predetermined portion of memory;
   verifying, based on the security key and the unique identifier, that the second computing device is authorized to access the specified range of memory;
   in response to verifying that the second computing device is authorized to access the specified range of memory, accessing, by the first computing device, the specified range of memory on behalf of the second computing device;
   in response to determining that the difference does not exceed the predetermined portion of memory, executing a command on the predetermined portion of memory to modify the specified range of memory at the received starting offset within the specified range of memory.

2. The method of claim 1, wherein the command comprises a write command that is executable by the first computing device for one of modifying, saving, and transferring data to the specified range of memory.

3. The method of claim 1, wherein the memory comprises non-volatile random access memory (NVRAM).

4. The method of claim 1, wherein the method further comprises:
   determining whether the security key and unique identifier corresponds to the specified range of memory; and
   in response to determining that the security key and unique identifier does not correspond to the specified range of memory, returning a failure indicator.

5. The method of claim 1, wherein the specified range of memory corresponds to a plurality of different defined portions of the memory, and
   wherein the method further comprises transferring a failure indicator back to the second computing device.

6. The method of claim 1, wherein the command comprises a command for writing data of a predetermined size to the specified range of memory from the first computing device to the second computing device, and
   wherein the method further comprises:
   determining whether the predetermined size of data exceeds a predetermined amount of data; and
   in response to determining that the predetermined size exceeds the predetermined amount of data, transmitting the predetermined amount of data from the first computing device to the second computing device by buffering the data in separate portions.

7. The method of claim 1, further comprising generating the security key and the unique identifier for the second computing device;
   associating the security key and the unique identifier with the specified range of memory; and
   communicating the security key and the unique identifier to the second computing device for use in accessing the specified range of memory.

8. A computing device comprising:
a memory including a specified range; and
a remote memory controller that:
- receives, from another computing device, a memory access request including a starting offset within a specified range of memory, a predetermined size of data, a predetermined portion of memory, security key, and unique identifier generated by the remote memory controller;
- determine a difference between the offset and the predetermined size of data;
- determine that the specified range of memory is within a predetermined portion of memory based on whether the difference exceeds the predetermined portion of memory;
- verify, based on the security key and the unique identifier, that the another computing device is authorized to access the specified range of memory;
- access, on behalf of the another computing device, the specified range of memory in response to verifying that the another computing device is authorized to access the specified range of memory; and
- in response to determining that the difference does not exceed the predetermined portion of memory, executing a command on the predetermined portion of memory to modify the specified range of memory at the received starting offset within the specified range of memory.

9. The computing device of claim 8, wherein the remote memory controller includes a first port and a second port, wherein the first port establishes connection to the memory and a device driver and the second port establishes connection to the second computing device.

10. The computing device of claim 8, wherein the command comprises a write command that is executable by the computing device for one of modifying, saving, and transferring data to the specified range of memory.

11. The computing device of claim 8, wherein the memory comprises non-volatile random access memory (NVRAM).

12. The computing device of claim 8, wherein the remote memory controller further:
- determines whether the security key and unique identifier corresponds to the specified range of memory; and
- in response to determining that the security key and unique identifier does not correspond to the specified range of memory, returns a failure indicator.

13. The computing device of claim 8, wherein the specified range of memory corresponds to a plurality of different defined portions of the memory, and
wherein the remote memory controller further transmits a failure indicator back to the another computing device.

14. The computing device of claim 8, wherein the command comprises a command for writing data of a predetermined size to the specified range of memory from the another computing device to the computing device via the PCIe interconnect, and
wherein the remote memory controller:
- determines whether the predetermined size of data exceeds a predetermined amount of data; and
- in response to determining that the predetermined size exceeds the predetermined amount of data, transmits the predetermined amount of data from the first computing device to the another computing device by buffering the data in separate portions.

15. The computing device of claim 8, wherein the remote memory controller:
- generates the security key and unique identifier for the another computing device;
- associates the security key and unique identifier with the specified range of memory; and
- communicates the security key and unique identifier to the another computing device for use in accessing the predetermined portion of memory.

16. A computing device comprising:
a communications device comprising at least one processor that communicates via a peripheral component interconnect express (PCIe) interconnect; and
a memory manager comprising at least one processor and memory that:
- receives, from another computing device, a starting offset within a specified range of memory, a predetermined size of data, a predetermined portion of memory, security key and unique identifier for accessing the specified range of memory associated with the another computing device;
- determines a difference between the offset and the predetermined size of data;
- determines that the specified range of memory is within a predetermined portion of memory based on whether the difference exceeds the predetermined portion of memory;
- communicates, to the another computing device, a memory access request including the security key and unique identifier via the PCIe interconnect;
- accesses the specified range of memory upon receipt of permission from the another computing device;
- executes a command to modify the specified range of memory at the received starting offset within the specified range of memory.

17. The computing device of claim 16, wherein the memory manager communicates, to the another computing device, an instruction to execute a command for modifying the specified range of memory.

18. The computing device of claim 17, wherein the command comprises a write command that is executable by the another computing device for one of modifying, saving, and transferring data to the specified range of memory.

* * * * *